United States Patent
Kato et al.

(10) Patent No.: US 7,088,960 B2
(45) Date of Patent: Aug. 8, 2006

(54) WIRELESS CHANNEL SETTING METHOD FOR MOBILE COMMUNICATION SYSTEM AND MOBILE COMMUNICATION CONTROL APPARATUS

(75) Inventors: Yasuhiro Kato, Yokohama (JP); Takehiro Nakamura, Yokosuka (JP); Seizo Onoe, Yokohama (JP); Akihiro Maebara, Yokohama (JP); Yutaka Ohto, Yokohama (JP); Shinji Ueda, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 451 days.

(21) Appl. No.: 10/600,329

(22) Filed: Jun. 23, 2003

(65) Prior Publication Data

US 2004/0005898 A1 Jan. 8, 2004

(30) Foreign Application Priority Data

Jun. 24, 2002 (JP) ............................. 2002-183525

(51) Int. Cl.
*H04B 7/00* (2006.01)

(52) U.S. Cl. .................. 455/69; 455/522; 455/115.3; 455/226.3

(58) Field of Classification Search ................ 455/442, 455/452, 439, 453, 522, 67.11, 26.1, 69, 115.3, 455/226.3, 127.1, 67.13, 277.2
See application file for complete search history.

(56) References Cited

U.S. PATENT DOCUMENTS 6,374,112 B1 4/2002 Widegren et al.

6,539,234 B1 * 3/2003 Hiramatsu et al. .......... 455/522

FOREIGN PATENT DOCUMENTS

| WO | WO 00/62572 | 10/2000 |
|----|-------------|---------|
| WO | WO 01/31950 | 5/2001 |
| WO | WO 02/43413 | 5/2002 |

\* cited by examiner

*Primary Examiner*—Tilahun Gesesse
(74) *Attorney, Agent, or Firm*—Oblon, Spivak, McClelland, Maier & Neustadt, P.C.

(57) ABSTRACT

Disclosed is a mobile communication system whereby, to reduce the connection time, a mobile station closely located to a base wireless station is permitted to continue to use a common channel for exchanging signals, and to suppress an increase in interference, an individual channel is set for a mobile station located near the edge of a cell, and to obtain a stabilized communication quality and to prevent an increase in the connection time, the probability that the transmission power will reach an upper limit is reduced. When communication between a mobile station and a wireless base station is started, the wireless base station measures the transmission power and the communication quality in the communication with the mobile station and the utilization ratio for a common channel, and compares the obtained values with predetermined threshold values. When the obtained values are lower than the threshold values, the wireless base station continues to use the common channel for signal transmission/reception. On the other hand, when the obtained values exceed the threshold values, the wireless base station sets an individual channel and sets a wireless channel so as to be capable of the continued use of the individual channel for the exchange of signals.

2 Claims, 4 Drawing Sheets

WIRELESS CHANNEL SETTING METHOD FOR MOBILE COMMUNICATION SYSTEM AND MOBILE COMMUNICATION CONTROL APPARATUS

CROSS-REFERENCE TO RELATED APPLICATION

This application is based upon and claims the benefit of priority from the prior Japanese Patent Application No. 2002-183525, filed on Jun. 24, 2002. The entire contents of which are incorporated herein by reference.

BACKGROUND OF THE INVENTION

1. Field of the Invention

The present invention relates to a wireless channel setting method for a mobile communication system and a mobile communication control apparatus.

2. Related Background Art

A mobile communication system, called "FOMA" (product name), that employs CDMA (Code Division Multiple Access) is well known as an IMT-2000 wireless access technique. For this mobile communication system, the following method is employed to set up a wireless channel between a mobile station and a wireless base station.

Since the wireless capacity with the CDMA technology is limited by the level of the interference from other mobile stations located within the same cell, the minimum required power must be employed by all mobile stations in the same cell when communicating with each other in order to reduce interference. As a result with regard to the conventional mobile communication system, the wireless quality between a wireless base station and a mobile station must be measured all the time, and fast transmission power control must be executed in accordance with the measurement results. In this manner, optimization of the transmission power can be achieved, and an improved system capacity and a stable transmission quality can be obtained.

Generally, wireless channels used for a wireless communication system include a "common channel", which is used by all mobile stations for transmission/reception when initiating communication, and an "individual channel", which is allocated for each mobile station as paired uplink and downlink. Consequently, when initiating communication, a mobile station first accesses the common channel, through which control signals are exchanged to set up an individual channel. Thereafter, the wireless channel of the mobile station is shifted to the individual channel to perform voice or data communication.

A "control signal", constituted by an indispensable group of signals transmitted to initiate communication between a mobile station and a network, includes data for identifying the type of mobile station and the requested service for verifying the mobile station, and for setting a confidentiality level. To accomplish all these matters, several signal exchanges are generally required.

Similarly, the FOMA system employs procedures for shifting from a common channel to an individual channel. Since the above described fast transmission power control can be applied only for the individual channel, which is a bi-directional channel, it is preferable that, while taking both the system capacity and the communication quality into account, the shift to the individual channel takes place as early as possible.

Therefore, conventionally, the channel switching process with a sequence in FIG. 4 is performed in the following manner. When a mobile station transmits a control signal over the common channel (sequence Q1), the wireless base station uses the common channel to designate an individual channel for control use (sequence Q2). Thereafter, the transmitting mobile station and the wireless base station switch the common channel to the individual channel for control use and exchange control signals (sequences Q3 and Q4). When the transmission/reception of the control signals has been completed, the wireless base station notifies the transmitting mobile station of an individual channel for communication use (sequence Q5), and in accordance with the communication type, such as voice communication or packet data communication, the two stations switch the current channel to the individual channel for communication use and again exchange wireless signals (sequences Q6 and Q7).

According to a wireless channel switching control method used in the conventional mobile communication system, the transmission/reception of signals over the common channel can be minimized, and individual channels can be employed for the exchange of almost all control signals. Therefore, greater effects can be realized by the fast transmission power control with regard to the individual channels.

However, according to a system such as the conventional mobile communication system, whereby an individual channel for control use and an individual channel for communication use are sequentially set from the common channel, it takes a long time for a user to connect and start transmission and to be capable of voice or data transmission, which has been problem. There are two reasons, the first of which is that, for a mobile station and a network, the layer 1 switching process, such as a change in the transmission rate, is accompanied by the switching of channels, and thus, a period of about 100 milliseconds, and up to seconds in a long case is required for the layer 1 switching process. The second reason is that the transmission rate for an individual channel for control use is lower than that for the common channel, so that, accordingly, an extended time period is required for the transmission of control signals. This second reason is due to the following. Since the common channel is shared by a plurality of mobile stations, the transmission rate provided for it is kept high to a degree. On the other hand, since the individual channel for control use is employed only by a pertinent mobile station, the transmission rate for the individual channel can not be thoroughly increased while taking the wireless and hardware resources into account if these are in proportion to the transmission rate.

As a countermeasure to solve these conventional shortcomings, there is a possible method that uses the common channel for exchanging all the control signals and that directly sets up the individual channel for communication use.

However, according to this countermeasure, regarding the state when the common channel is used, because of the system configuration, fast transmission power control is impossible, and depending on the conditions at the mobile station such as the current location thereof and the utilization thereof, the system capacity and the communication quality obtained may be unsatisfactory, compared with the state wherein an individual channel is used. Further, since the transmission rate for the common channel is higher and the peak transmission power is greater compared with those for an individual channel, the uplink and downlink paths through the common channel tend to act as interference sources for other mobile stations, especially when the pertinent mobile station is located near the edge of a cell. Furthermore, when the transmission power reaches the upper limit, a satisfactory communication quality is apt to not be obtained. And in addition, when multiple mobile stations are connected to the common channel, a delay in the uplink random access and a delay in the downlink transmission waiting may occur due to a contention control, and the connection time may be further extended.

SUMMARY OF THE INVENTION

The present invention is devised in consideration of the above described conventional technical problems. It is an object of the present invention to provide a mobile communication system with a wireless channel setting technique whereby, in order to reduce connection time, a mobile station in a vicinity of a wireless base station is permitted to continue to use a common channel for signal exchange, and in order to suppress any increase in interference and to reduce the probability of the transmission power reaching an upper limit, an individual channel is set up for a mobile station located near the edge of a cell, so as to stabilize the communication quality and to prevent an increase in the connection time.

The first aspect of the present invention is a wireless channel setting method for a mobile communication system in which a common channel, which all mobile stations are permitted to use for signal exchange at the start of communication, and an individual channel, which is tuned through the setting process for each mobile station, are switched so as to be used as a wireless channel between a mobile station and a wireless base station, the method comprising the steps of: (a) the wireless base station receives a transmission signal from a specific mobile station through the common channel, and compares a transmission power value to transmit to the mobile station with a predetermined threshold value; (b) when the transmission power value is lower than the predetermined threshold value, the wireless base station continues the signal transmission/reception, through the common channel, with the specific mobile station; and (c) when the transmission power value exceeds the predetermined threshold value, the wireless base station sets an individual channel and continues signal transmission/reception, through the individual channel, with the specific mobile station.

According to the wireless channel setting method for the mobile communication system in the first aspect of the present invention, in accordance with the magnitude of the transmission power of the mobile station, either the common channel or the individual channel is selected as the channel to be used for exchanging a succeeding signal. Therefore, in order to reduce the connection time, the common channel is continuously employed to exchange signals with a closely located mobile station, while for a mobile station near the edge of the cell, an individual channel is set to suppress an increase in the interference. Further, to stabilize the communication quality and to prevent an increase in the connection time, the probability that the transmission power will reach an upper limit is reduced.

The second aspect of the present invention is a wireless channel setting method for a mobile communication system between the mobile station and the wireless base station in which a common channel, which every mobile station is permitted to use for signal exchange at the start of communication, and an individual channel which is tuned through the setting process for each mobile station, are switched so as to obtain a wireless channel for use by a mobile station and a wireless base station, the method comprising the steps of: (a) the wireless base station receives a transmission signal from a specific mobile station through the common channel, and compares the communication quality level to transmit with the mobile station with the predetermined threshold; (b) when the communication quality level is lower than the predetermined threshold value, the wireless base station continues the signal transmission/reception, through the common channel, with the specific mobile station; and (c) when the communication quality level exceeds the predetermined threshold value, the wireless base station sets an individual channel and continues the signal transmission/reception, through the individual channel, with the specific mobile station.

According to the wireless channel setting method for the mobile communication system in the second aspect of the present invention, in accordance with the wireless communication quality through the common channel, either the common channel or the individual channel is selected as the channel to be used for signal transmission/reception. Therefore, for a mobile station in which the wireless communication quality through the common channel is high, the common channel is continuously employed for exchanging signals in order to reduce the connection time, and for a mobile station in which the wireless communication quality through the common channel is low, the individual channel is set in order to stabilize the communication quality and to prevent an increase of the connection time.

The third aspect of the present invention is a wireless channel setting method for a mobile communication system in which a common channel, which every mobile station is permitted to use for signal exchange at the start of communication, and an individual channel, which is tuned through the setting process for each mobile station, are switched so as to obtain a wireless channel for use by a mobile station and a wireless base station, the method comprising the steps of: (a) the base wireless station receives a signal from a specific mobile station through the common channel, and compares a utilization ratio of the common channel with a predetermined threshold value; (b) when the utilization ratio of the common channel is lower than the predetermined threshold value, the base wireless station continues the signal transmission/reception, through the common channel, with the specific mobile station; and (c) when the utilization ratio of the common channel exceeds the predetermined threshold value, the wireless base station sets an individual channel and continues the signal transmission/reception, through the individual channel, with the specific mobile station.

According to the wireless channel setting method for the mobile communication system in the third aspect of the present invention, in accordance with the utilization ratio of the common channel, either the common channel or the individual channel is selected as the channel to be used for signal transmission/reception. When the traffic carried by the common channel is low, signal transmission/reception continues to be performed through the common channel in order to reduce the connection time, and when the traffic carried by the common channel is heavy, an individual channel is set to prevent an increase in the connection time due to contention with another mobile station.

The fourth aspect of the present invention is a mobile communication system that switches, as a wireless channel to be used with a mobile station, a common channel through which every mobile station is permitted to use for signal exchange at the start of communication, and an individual channel which is tuned through the setting process for each mobile station, comprising: a transmitter/receiver for exchanging wireless signals with a mobile station; a control signal processor for setting and switching the wireless signals in accordance with a received instruction; a wireless channel setting controller for determining which wireless channel is to be used based on a notified transmission power over the communication channel for each mobile station, and for instructing the wireless channel to be used to the control signal processor; and a transmission power measuring unit for measuring the transmission power over the common channel for each mobile station, and for notifying the transmission power value to the wireless channel setting controller, wherein the wireless channel setting controller compares the transmission power value provided by a specific mobile station through the common channel with a predetermined threshold value, and when the transmission power value is lower than the predetermined threshold value, the wireless channel setting controller continues the transmission/reception of signals, through the common channel, with the specific mobile station, and when the transmission power value exceeds the predetermined threshold value, the wireless channel setting controller sets an individual channel for the specific mobile station and transmits an instruction to the control signal processor to continue the transmission/reception of signals through the individual channel.

According to the mobile communication system in the fourth aspect of the present invention, in accordance with the magnitude of the transmission power of the mobile station, either the common channel or the individual channel is selected as the channel to be used for exchanging a succeeding signal. Therefore, in order to reduce the connection time, the common channel is continuously employed to exchange signals with a closely located mobile station, while for a mobile station near the edge of the cell, the individual channel is set to suppress an increase in the interference. Further, to stabilize the communication quality and to prevent an increase in the connection time, the probability that the transmission power will reach the upper limit is reduced.

The fifth aspect of the present invention is a mobile communication system that switches, as a wireless channel to be used with a mobile station, a common channel through which all mobile stations are permitted to use for signal exchange at the start of communication, and an individual channel that is tuned through, the setting process for each mobile station, comprising: a transmitter/receiver for exchanging wireless signals with a mobile station; a control signal processor for setting and switching the wireless signals in accordance with a received instruction; a wireless channel setting controller for determining which wireless channel is to be used by each mobile station based on a notified communication quality level for each mobile station, and for, instructing the wireless channel to be used to the control signal processor; and a communication quality measuring unit for measuring the communication quality level for each mobile station, and for notifying the commu- nication, quality to the wireless channel setting controller, wherein the wireless channel setting controller compares the communication quality level for a signal that is transmitted from a specific mobile station through the common channel with a predetermined threshold value and, when the communication quality level is lower than the predetermined threshold value, the wireless channel setting controller continues the transmission/reception of signals through the common channel with the specific mobile station, and when the communication quality level exceeds the predetermined threshold value, the wireless channel setting controller sets an individual channel for the specific mobile station and transmits an instruction to the control signal processor to continue the transmission/reception of signals through the individual channel.

According to the mobile communication system in the fifth aspect of the present invention, in accordance with the wireless communication quality for the common channel, either the common channel or the individual channel is selected as the channel to be used for signal transmission/ reception. Therefore, for the mobile station in which the wireless communication quality through the common channel is high, the common channel is continuously employed for exchanging signals in order to reduce the connection time, and for the mobile station in which the wireless communication quality through the common channel is low, the individual channel is set in order to stabilize the communication quality and to prevent an interference increase.

The sixth aspect of the present invention is a mobile communication system that switches, as a wireless channel to be used with a mobile station, a common channel through which every mobile station is permitted to use for signal exchange at the start of communication, and an individual channel that is tuned through the setting process for each mobile station, comprising: a transmitter/receiver for exchanging wireless signals with a mobile station; a control signal processor for setting and switching the wireless signals in accordance with a received instruction; a wireless channel setting controller for determining which wireless channel is to be used for each mobile station based on a notified usage ratio of the common channel, and for instructing the wireless channel to be used to the control signal processor; and a utilization ratio measuring unit for measuring the utilization ratio of the common channel, and for notifying the utilization ratio to the wireless channel setting controller, wherein the wireless channel setting controller compares the utilization ratio of the common channel obtained at a time when a signal is received from a specific mobile station through the common channel with a predetermined threshold value and, when the utilization ratio of the common channel is equal to or lower than the predetermined threshold value, the wireless channel setting controller continues the transmission/reception of signals, through the common channel with the specific mobile station, and when the utilization ratio of the common channel exceeds the predetermined threshold value, the wireless channel setting controller sets an individual channel for the specific mobile station and transmits an instruction to the control signal processor to continue the transmission/reception of signals through the individual channel.

According to the mobile communication system in the sixth aspect of the present invention, in accordance with the utilization ratio of the common channel, either the common channel or the individual channel is selected as the channel to be used for signal transmission/reception. When the traffic carried through the common channel is low, signal transmission/reception continues to be performed through the common channel in order to reduce the connection time, and when the traffic carried through the common channel is heavy, an individual channel setting is made to prevent an increase in the connection time .due to the contention with another mobile station.

The seventh aspect of the present invention is a mobile communication apparatus comprising: a control signal processor for setting and switching wireless signals in accordance with a received instruction; a wireless channel setting controller for determining which wireless channel is to be used by each mobile station based on a notified transmission power over the common channel, and for instructing the wireless channel to be used to the control signal processor; and a transmission power measuring unit for measuring the transmission power value over the wireless channel for each mobile station, and for notifying the transmission power value to the wireless channel setting controller, wherein the wireless channel setting controller compares the transmission power value provided by a specific mobile station through the common channel with a predetermined threshold value and, when the transmission power value is lower than the predetermined threshold value, the wireless channel setting controller continues the transmission/reception of signals through the common channel with the specific mobile station; and when the transmission power value exceeds the predetermined threshold value, the wireless channel setting controller sets the individual channel for the specific mobile station and transmits an instruction to the control signal processor to continue the transmission/reception of signals through the individual channel.

According to the mobile communication apparatus in the seventh aspect of the present invention, in accordance with the magnitude of the transmission power of the mobile station, either the common channel or the individual channel is selected as the channel to be used for exchanging a succeeding signal. Therefore, in order to reduce the connection time, the common channel is continuously employed to exchange signals with a closely located mobile station, while for a mobile station near the edge of the cell, an individual channel is set to suppress an increase in the interference. Further, to stabilize the communication quality and to prevent an increase in the connection time, the probability that the transmission power will reach an upper limit is reduced.

The eighth aspect of the present invention is a mobile communication apparatus comprising: a control signal processor for setting and switching wireless signals in accordance with a received instruction; a wireless channel setting controller for determining which wireless channel is to be used for each mobile station based on a notified communication quality level for each mobile station, and for instructing the wireless channel to be used to the control signal processor; and a communication quality measuring unit for measuring the communication quality level for each mobile station, and for notifying the communication quality to the wireless channel setting controller, wherein the wireless channel setting controller compares the communication quality level of a signal which is transmitted from a specific mobile station through a common channel with a predetermined threshold value and, when the communication quality level is lower than the predetermined threshold value, the wireless channel setting controller continues the transmission/reception of signals through the common channel, with the specific mobile station, and when the communication quality level exceeds the predetermined threshold value, the wireless channel setting controller sets an individual channel for the specific mobile station and transmits an instruction to the control signal processor to continue the transmission/reception of signals through the individual channel.

According to the mobile communication apparatus in the eighth aspect of the present invention, in accordance with the wireless communication quality for the common channel, either the common channel or an individual channel is selected as the channel to be used for signal transmission/reception. Therefore, for a mobile station in which the wireless communication quality through the common channel is high, the common channel is continuously employed for exchanging signals in order to reduce the connection time, and for a mobile station for which the wireless communication quality for the common channel is low, the individual channel is set in order to stabilize the communication quality and to prevent an interference increase.

The ninth aspect of the present invention of the present invention is a mobile communication apparatus comprising: a control signal processor for setting and switching wireless signals in accordance with a received instruction; a wireless channel setting controller for determining which wireless channel is to be used for each mobile station based on a notified usage ratio for a common channel, and for instructing the wireless channel to be used to the control signal processor; and a utilization ratio measuring unit for measuring the utilization ratio for the common channel, and for notifying the utilization ratio to the wireless channel setting controller, wherein the wireless channel setting controller compares the utilization ratio for the common channel obtained when a signal is received from a specific mobile station through the common channel with a predetermined threshold value and, when the utilization ratio for the common channel is lower than the predetermined threshold value, the wireless channel setting controller continues the transmission/reception of signals, through the common channel, with the specific mobile station, and when the utilization ratio for the common channel exceeds the predetermined threshold value, the wireless channel setting controller sets an individual channel for the specific mobile station and transmits an instruction to the control signal processor to continue the transmission/reception of signals through the individual channel.

According to the mobile communication apparatus in the ninth aspect of the present invention, in accordance with the utilization ratio of the common channel, either the common channel or the individual channel is selected as the channel to be used for signal transmission/reception. When the traffic carried by the common channel is low, signal transmission/reception continues to be performed through the common channel in order to reduce the connection time, and when the traffic carried by the common channel is heavy, the individual channel is set to prevent an increase in the connection time due to the contention with another mobile station.

DETAILED DESCRIPTION OF THE PREFERRED EMBODIMENT

Figure 1:
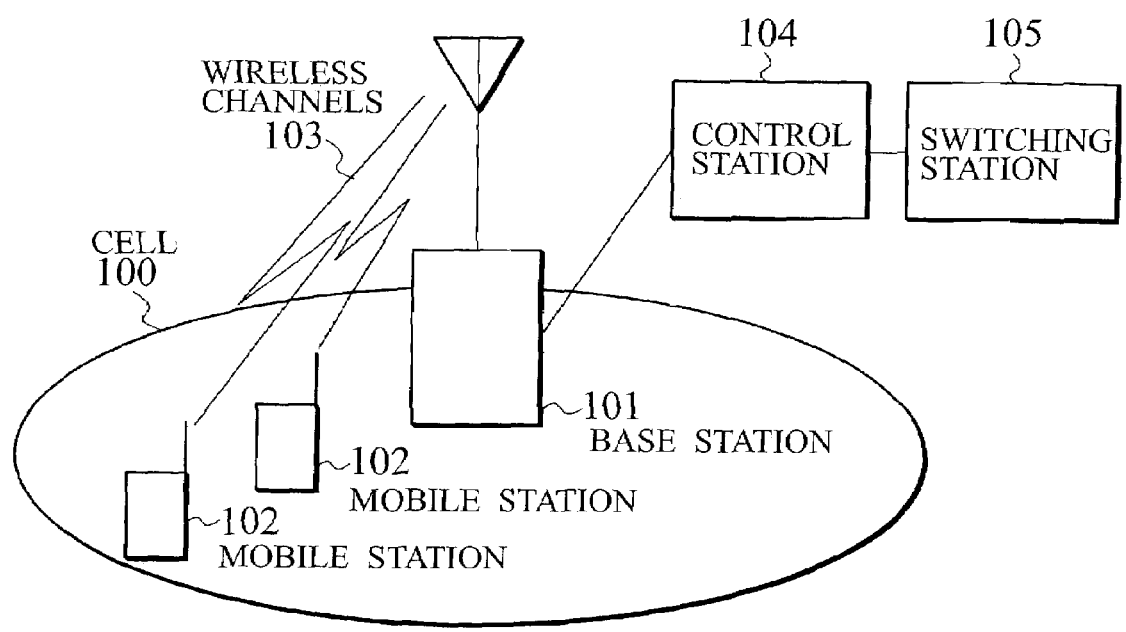
FIG. 1 is a block diagram showing a mobile communication system according to one embodiment of the present invention.

The preferred embodiment of the present invention will now be described in detail. The configuration of a mobile communication system according to one embodiment of the present invention is shown in FIG. 1. The mobile communication system includes a wireless base station 101, one or a plurality of mobile stations 102, a control station 104 and a mobile switching station 105. The wireless base station 101 performs communication with the mobile stations 102. The mobile stations 102 are located in a wireless zone (cell) 100 covered by the wireless base station 101. The control station 104 is connected to the wireless base station 101 and controls the wireless base station 101 and the mobile stations 102. The mobile switching station 105 is connected to the control station 104.

Wireless channels 103 are set up between the wireless base station 101 and the mobile stations 102 for wireless communication. The wireless channels 103 include a common channel over which all of the mobile stations 102 can transmit or receive wireless signals at the start of communication, and an individual channel which is allocated as a pair of uplink and downlink paths for each mobile station 102.

Figure 2:
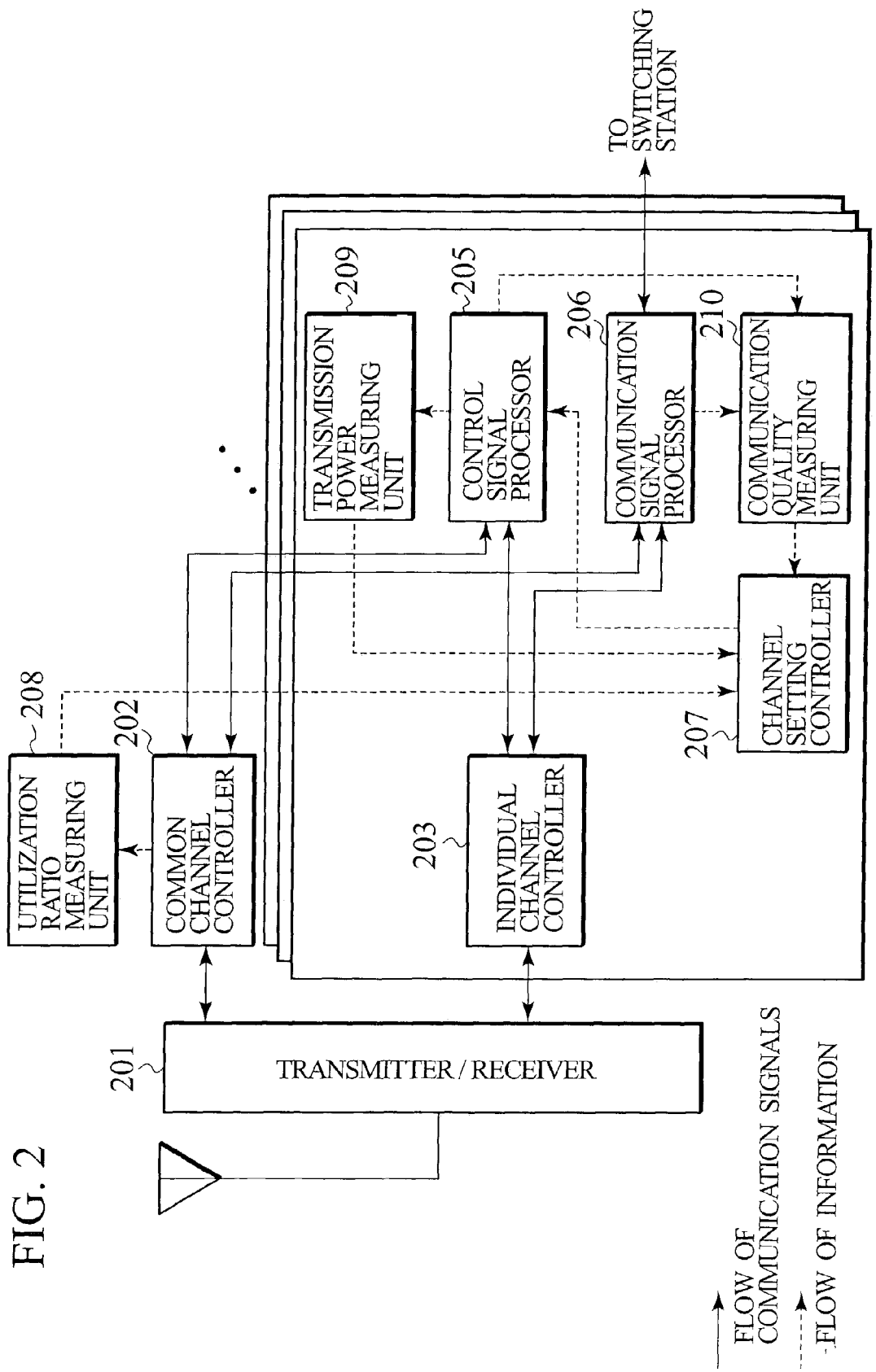
FIG. 2 is a block diagram showing a wireless channel setting function that is provided for either a wireless base station or a control station, or is jointly shared, in the mobile communication system according to the embodiment.

The functional structure for the wireless base station 101 and the control station 104 is shown in FIG. 2. Except for a transmitter/receiver 201, this structure may be provided either for the wireless base station 101 or the control station 104. In FIG. 2, arrows indicated by solid lines represent the transmission of a communication signal such as a control signal or a voice or packet data signal, and arrows indicated by broken lines represent the transmission of information required for the control of the individual processors.

The transmitter/receiver 201 performs a de-multiplexing operation for the wireless channels, the CDMA baseband processing and the modulation/demodulation. A common channel controller 202 performs uplink random access control for the individual mobile stations 102, and multiplexes a downlink control signal to be transmitted down to the mobile stations 102 into the common channel. An individual channel controller 203 continuously measures the wireless quality of the communications between the mobile stations 102, with respect both to an individual channel for control use and an individual channel for communication use, and executes fast transmission power control.

A control signal processor 205 performs the termination processing for a control signal exchanged by the mobile station 102 and the base wireless station 101, the termination processing performed for a data link layer of a wireless interval for a control signal, and, performs the setting and switching of the wireless channel in accordance with an instruction received from a wireless channel setting controller 207. A communication signal processor 206 performs the relay processing for a communication signal such as voice or packet data that is transmitted to or received from the mobile switching station 105 via the control station 104, and also performs the termination processing for a data link layer of a wireless interval for the communication signal.

The wireless channel setting controller 207 determines a wireless channel to be set, based on the information received from a utilization ratio measuring unit 208, the information received from a transmission power measuring unit 209, and the information received from a communication quality measuring unit 210, and instructs the wireless channel for the control signal processor 205 and the communication signal processor 206.

The utilization ratio measuring unit 208 measures the utilization ratio of the common channel, and notifies the measured utilization ratio to the wireless channel setting controller 207. The measurement of the utilization ratio for the common channel is calculated based on either the number of mobile stations connected to the common channel or the number of transmission blocks transmitted in a wireless interval. A transmission power measuring unit 209 measures, for each mobile station 102, the transmission power through the common channel, and notifies the measured transmission power to the wireless channel setting controller 207. The measurement of the transmission power is done based on the reception level at the mobile station 102, which is reported to the control signal processor 205 by the mobile station 102. The communication quality measuring unit 210 measures the communication quality for each mobile station 102, and notifies the measured communication quality to the wireless channel setting controller 207. For the measurement of the communication quality, the errors occurring in transmission blocks in the wireless interval which constitutes the control signals received through the wireless channel and the communication signals are measured.

Figure 3:
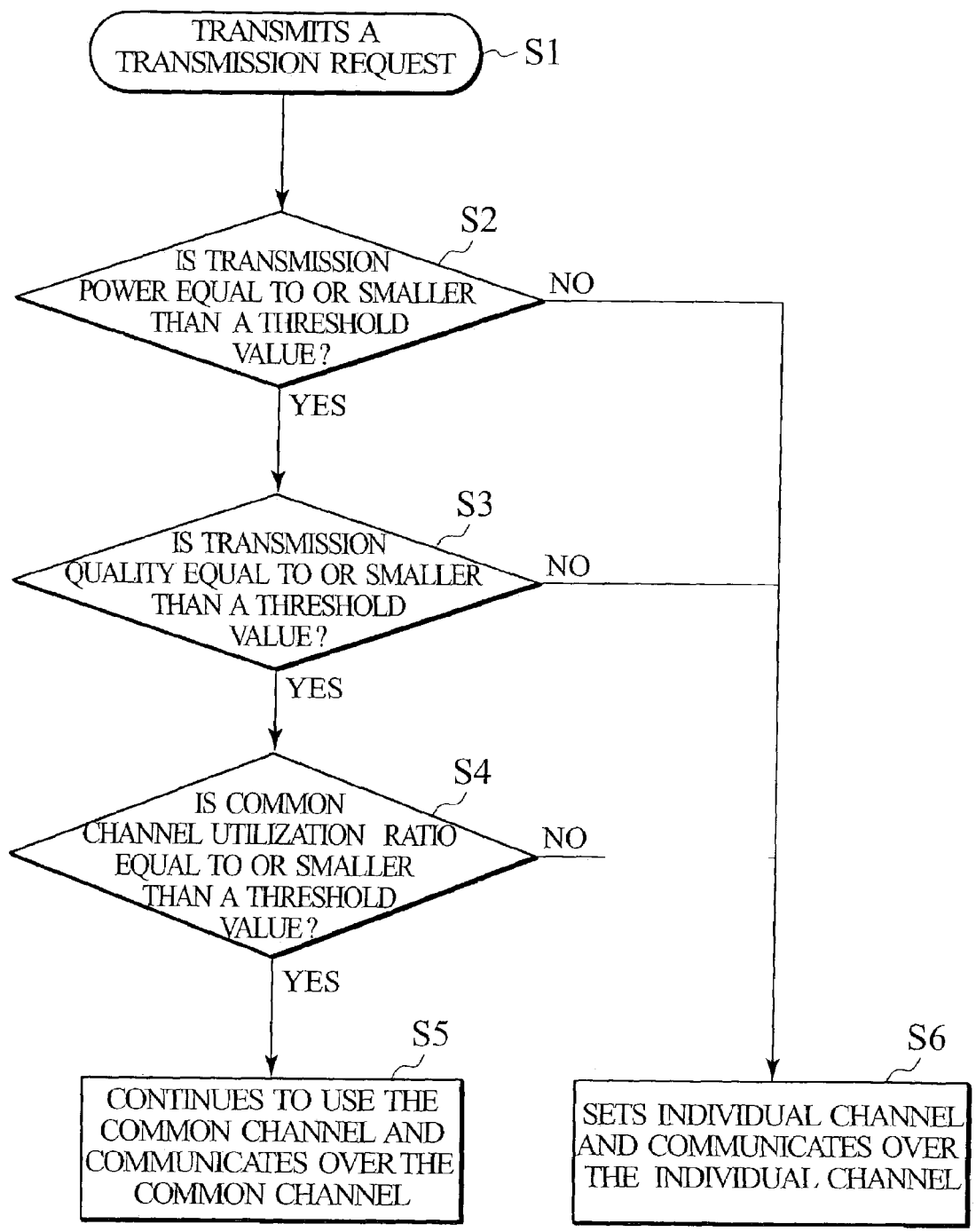
FIG. 3 is a flowchart showing the wireless channel setting process performed by the mobile communication system according to the embodiment.
Figure 4:
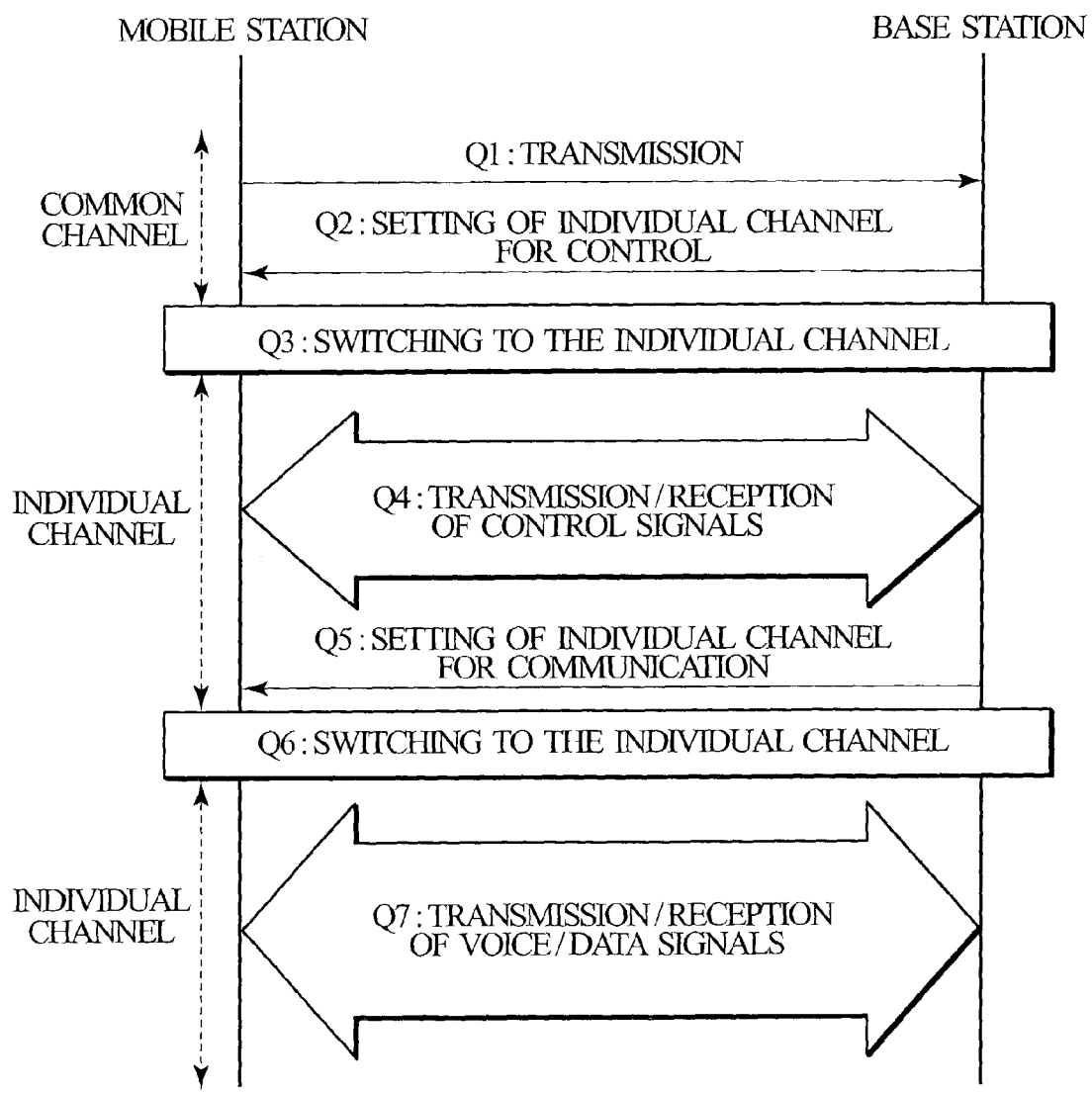
FIG. 4 is a diagram showing the wireless channel setting process sequence performed by a conventional mobile communication system.

Referring to the flowchart in FIG. 3, an explanation will be given for a wireless channel setting method performed by the wireless channel setting controller 207 of the mobile communication system having the above described configuration.

When communication between the mobile station 102 and the wireless base station 101 is started, the mobile station 102 transmits a transmission request signal to the wireless base station 101 under the common channel (step S1). This signal includes the reception level at the mobile station 102, which enables the wireless base station 101 to calculate the transmission power for the mobile station 102.

Upon the reception of the transmission request signal, first, the wireless base station 101 compares the transmission power value that the transmission power calculation unit 209 has calculated based on the reception level of the mobile station 102 with a predetermined threshold value (step S2). In this comparison, when the transmission power value is equal to or lower than the threshold value, program control moves to the next decision step. On the contrary, when the transmission power value exceeds the threshold value, it is judged that, while the common channel continues to be used for the exchange of signals, interference with other mobile stations will be increased and the wireless communication quality may become unstable, and an individual channel is set (step S6).

Then, the wireless base station 101 compares the error ratio for transmission blocks in a wireless interval, which is measured by the communication quality measuring unit 210 with a predetermined threshold value (step S3). When the error ratio is equal to or smaller than the threshold value in this comparison, program control moves to the next decision step. On the contrary, When the error ratio exceeds the threshold value, the wireless base station 101 judges that the connection time will be extended due to retransmission of the signals over the common channel, and sets an individual channel (step S6).

Finally, the wireless base station 101 compares the utilization ratio for the common channel that is measured by the utilization ratio measuring unit 208 with a predetermined threshold value (step S4). When the common channel utilization ratio is equal to, or smaller than the threshold value, instead of setting an individual channel, the wireless base station 101 continues to use the common channel for the exchange of signals (step S5). On the other hand, when the common channel utilization ratio exceeds the threshold value, the wireless base station 101 judges that the connection time will be extended due to the control of contention with another mobile station, and sets an individual channel (step S6).

Through this processing sequence, for the signal transmission/reception operation performed with the mobile station 102, the wireless base station 101 can set an optimal wireless channel which is estimated to have the shortest connection time, and can suppress an increase in the interference that occurs when the common channel is continuously employed to exchange signals with a mobile station located near the edge of a cell.

In this embodiment, the configuration is determined and controlled based on the combination including all the measurements performed for the transmission power value, the communication quality, and the utilization ratio of the common channel. However, these measurements may effectively exert respective advantages even if the measurements are each realized independently.

Furthermore, in this embodiment, the wireless channel is set regardless of the type of communication signal such as voice or packet data. For voice communication or for the transmission of a large amount of packet data, only the control signals must be exchanged, in the same manner as in the embodiment of the present invention, whereas a method for setting a fast individual communication channel may be finally employed.

What is claimed is:

1. A wireless channel setting method for a mobile communication system in which a common channel, which all mobile stations are permitted to use for signal exchange at the start of communication, and an individual channel, which is tuned through the setting process for each mobile station, are switched so as to be used as a wireless channel between a mobile station and a wireless base station, the method comprising the steps of:

receiving, at the wireless base station a transmission signal from a specific mobile station through the common channel; and sequentially comparing, to a respective corresponding predetermined threshold value, a transmission power value to transmit to the mobile station, a communication quality level to transmit with a mobile station, and a utilization ratio of the common channel, wherein when the transmission power value, the communication quality level and utilization ratio are lower than the respective corresponding predetermined threshold values, the wireless base station continues the signal transmission/reception, through the common channel, with the specific mobile station, and when any of the sequentially compared transmission power value communication quality level, and utilization ratio exceed the respective corresponding predetermined threshold value, the wireless base station sets said individual channel and continues signal transmission/reception, through the individual channel, with the specific mobile station.

2. A mobile communication apparatus comprising:

a control signal processor for setting and switching wireless signals in accordance with a received instruction;

a wireless channel setting controller for determining which wireless channel is to be used by each mobile station based on a notified transmission power over the common channel, and for instructing the wireless channel to be used to the control signal processor; and a transmission power measuring unit configured to measure the transmission power value over the wireless channel for each mobile station, and for notifying the transmission power value to the wireless channel setting controller, a communication quality measuring unit configured to measure the communication quality level for each mobile station, and for notifying the communication quality to the wireless channel setting controller, a utilization ratio measuring unit configured to measure the utilization ratio for the common channel, and for notifying the utilization ratio to the wireless channel setting controller, wherein the wireless channel setting controller sequentially compares the transmission power value, the communications quality level and the utilization ratio, respectively with corresponding predetermined threshold values and, when the transmission power value, the communication quality level and the utilization ratio are each lower than the respective corresponding predetermined threshold values, the wireless channel setting controller continues the transmission/reception of signals through the common channel with the specific mobile station, and when any of the transmission power value, the communications quality level. and utilization ratio exceed the respective correpsonding predetermined threshold values, the wireless channel setting controller sets the individual channel for the specific mobile station and transmits an instruction to the control signal processor to continue the transmission/reception of signals through the individual channel.

* * * * *